United States Patent [19]

Vandelanoite

[11] 4,291,999

[45] Sep. 29, 1981

[54] DEVICE FOR THE ASSEMBLING OF A PLURALITY OF CONVERGING TUBULAR BARS

[76] Inventor: Pierre Vandelanoite, 5/6 Rue Mercier, Lys-les-Lannoy, France, 59390

[21] Appl. No.: 77,829

[22] Filed: Sep. 21, 1979

[30] Foreign Application Priority Data

Sep. 22, 1978 [FR] France ............................. 78 27721

[51] Int. Cl.³ ............................................. F16B 7/04
[52] U.S. Cl. .................................... 403/297; 403/172
[58] Field of Search .............. 403/297, 171, 172, 176, 403/295, 298

[56] References Cited

U.S. PATENT DOCUMENTS 3,547,475  12/1970  Gingher ............................ 403/297
3,822,101  7/1974  Schneider ......................... 403/295
4,076,432  2/1978  Glaser .............................. 403/171 X

FOREIGN PATENT DOCUMENTS 282838  6/1964  Australia ............................. 403/295
2262218  9/1975  France ................................. 403/297
438848  12/1967  Switzerland ........................ 403/171
1433506  4/1976  United Kingdom ................ 403/295

Primary Examiner—James Kee Chi
Attorney, Agent, or Firm—Martin A. Farber

[57] ABSTRACT

The present invention relates to a device for the assembling of a plurality of converging tubular bars by means of a central star-shaped core with points which fit into the tube ends, each of the points having means for clamping by expansion in said tubes, the ends of which are in their turn shaped to fit each other in such a way as to completely cover the central core, an entrance being, however, provided in order to act on the clamping means of each point.

6 Claims, 5 Drawing Figures

DEVICE FOR THE ASSEMBLING OF A PLURALITY OF CONVERGING TUBULAR BARS

Problem Raised

There is concerned the problem of being able rapidly to assemble tubes of generally orthogonal shape by a simple means which is removable but removable only when this is necessary. There is also concerned assuring the rigidity of this assemblage.

Prior Art and Drawbacks

There are numerous assemblies of this type with screw-locking devices in which generally the screw is threaded into the tube and rests against a point or branch of the star-shaped central core. In order to avoid any undesired movement it is absolutely necessary to produce a strong clamping which can at times damage the threads of the screw and which does not prevent movements in the plane perpendicular to the axis of the screw. As soon as the screw becomes loose, the assembly is no longer rigid and can easily break apart.

Along this line one may cite French Pat. No. 1,218,379 (GRAJECKI) which concerns an angular assembling of hollow profiled bars. This assembling is effected by one or more rigid angle members which only partially fill up the inside of the profiled bars to be assembled, another part of this space being occupied by wedge-shaped keys which move on inclined planes of the angle members, in particular under the action of screws. In this system, the displacement of the keys in order to lock the tubes has a tendency to spread the junction of the two tubes along their oblique plane (miter cut).

Furthermore, the clamping of a coupling is effected by access through a hole in another tube which is not involved, which limits the node (joint) to at most three tubes and even generally to two; four tubes cannot be assembled with this system. It may also be pointed out that the entrance to the screws from the outside is not esthetically pleasing for furniture, since it is effected in the salient corners. No take-up of play in the direction perpendicular to the displacement of the keys is provided, and the assembly is not rigid.

French Pat. No. 2,045,969 (MAIWORM) discloses a system of assembly of the type in which the clamping is effected in a single direction by means of screws 17, 18 or needle-type screws 27.

There are a large number of complicated parts which are therefore expensive; no take-up of play around the axes of the screws 17, 18 is possible and the rigidity of the assembly is questionable. The cross-section of the parts constituting the star-shaped central core is reduced by half, which decreases the mechanical strength of the assembly. Furthermore, this system does not make it possible to effect the assembling of two tubes having a 45° cut (miter cut), as is indispensible in furniture, primarily for esthetic reasons, and there are required at least two tubes which abut along straight sections with another tubular element of square section 1 which must have plugs if esthetic appearance is to be maintained. Since this element 1 is open, it is of little strength.

In order to arrange tubular branches perpendicular to others, an assembly screw 27 is provided which produces its thrust only in a single direction, which results in a deformation of the profiled member in the corner thereof. In order to produce a low table with this system, for instance, a plug is needed on the top, which is not esthetically pleasing.

As in the arrangements mentioned above, the clamping stipulated in German Pat. No. 1,930,039 (SCHUERMANN) is not effected in the corners but on the faces, and oscillation of the assembly remains possible. Although the parts, such as 3, 31, 13 are applied to each other along surfaces, the contact is linear in the case of the parts 32, 34, 16, 17 which move away from each other on one side, bending around an axis. In this system, the parts are complicated and difficult to obtain and therefore expensive and the clamping is not controlled; as a matter of fact, displacement in one direction of a part such as 13 implies another lateral displacement which is directly proportional thereto in accordance with a fixed function determined by the inclination of the teeth in the inclined planes of the branches 16, 17; the clamping therefore cannot be distributed in accordance with the requirements adapted in two perpendicualr directions.

As a function of the dimensional tolerances, one has a coupling which can be locked around one axis of rotation but not around the other.

Finally, French Pat. No. 2,089,676 (OFFENBROICH) discloses a non-disassemblable device in which the clamping is not expandable; there is involved a force-fitting on cones, which force-fit cannot be removed.

The present invention is intended to overcome all of these drawbacks.

DESCRIPTION OF THE INVENTION

The arrangement of the invention is characterized primarily by the fact that the expansion clamping means is composed of two parts one of which is integral with the central core, the parts being spread apart from each other by a screw-clamping means, each of the two parts having two lateral oblique bearing surfaces cooperating with corresponding bearing surfaces on the inside of the tubes, the two parts furthermore having, on the side of the end of the points or branches, corresponding inclined planes which tend to move the said parts away from each other if one tries to displace the movable part longitudinally during the commencement of uncoupling.

More precisely in the case of orthogonal tubes of square section, the assembly is characterized by a core with orthogonal points or branches of generally square cross section, each edge thereof having an enlargement with an external cover beveled at 45° corresponding to a suitable bevel within the tube, each point cooperating with a floating plate whose distance from the body of the central core can be adjusted by a screw which pierces through the plate and is accessible from the outside, this screw cooperating with a fixed nut on the said plate and the end of the plate facing the end of the point has an inclined plane which corresponds with a corresponding inclined plane of the point, the two inclined planes being inclined towards the inside of the point or branch.

In accordance with a preferred embodiment, access to the screw of the plate is effected through a hole drilled in the tube. The plates are preferably located on the reentrant-corner side of the points or branches of the cores.

SOLUTION TO THE PROBLEM AND ADVANTAGES

The application of the clamping forces on four rows inclined at 45° in four different directions immobilizes each of the tubes in all possible directions. Furthermore, the existence of floating plates with an inclined plane effecting the moving away of the plate, that is to say the clamping of the coupling when one tries to uncouple a tube, prevents accidental uncoupling,

BRIEF DESCRIPTION OF THE FIGURES

The invention will be better understood by means of the following description which indicates one nonlimiting example of a practical embodiment thereof and is illustrated in the accompanying drawings in which.

DESCRIPTION OF ONE EMBODIMENT

Figure 1:
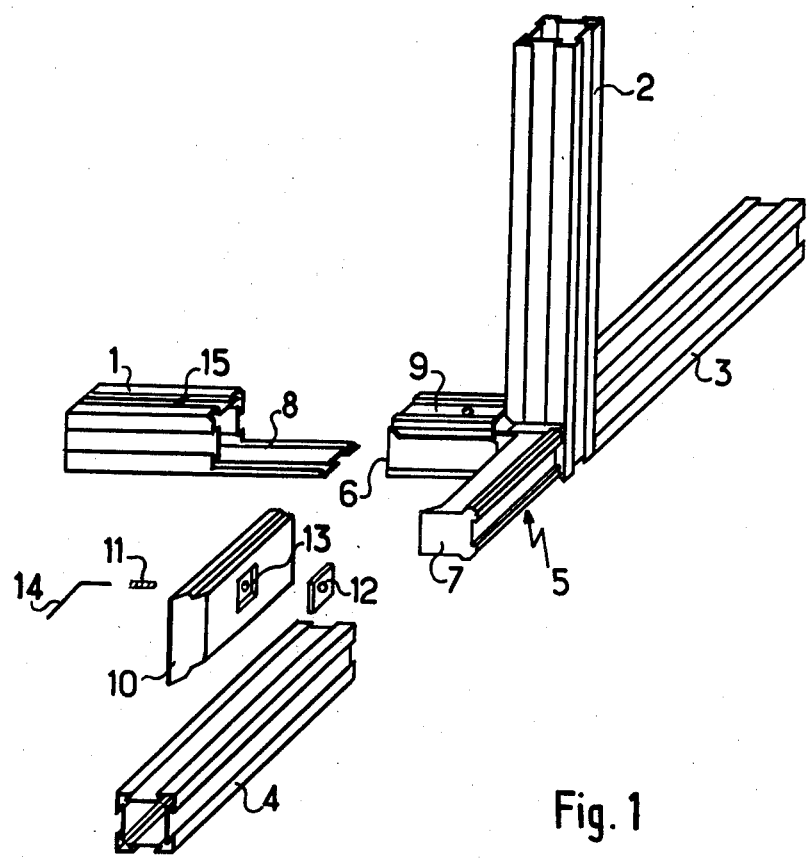
FIG. 1 is an exploded perspective view of an assembly of four orthogonal tubes by means of the device of the invention.
Figure 2:
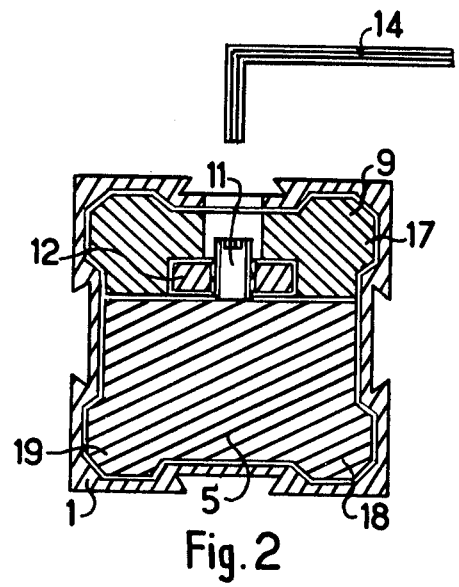
FIG. 2 is a view in cross section of a point or branch with the tube coupled.

The system of the invention, shown in FIG. 1, serves to assemble four converging square tubes 1,2,3,4 by means of a star-shaped central core with points or branches 5. For convenience in drawing, the tubes 1 and 4 have been shown disconnected from the two points or branches 6 and 7. The tubes 2 and 3 are fitted in similar branches which are, of course, invisible. The tubes 1 and 2 have notchings such as 8 so that they properly fit each other, completely covering the core 5 so that the latter is invisible. Each of the points or branches 6 or 7 has an expansion clamping means composed of a floating plate 9, 10 which can be moved away moreover from the central core by means of a screw 11 which cooperates with a nut 12 embedded in a corresponding recess provided in the plate 9, 10. The screw 11 is a hexagonal socket headless set screw which can be operated by a wrench 14 by means of relatively small holes such as 15 drilled in the tubes 1 to 4.

One essential feature of the invention resides in the fact that the edges of the points or branches 6, 7 have enlargements 16,17,18,19 with an external corner such as 20 beveled at 45°. Furthermore, the internal corners of the tubes 1,2,3,4 are beveled at 45° in the same manner.

Figure 3:
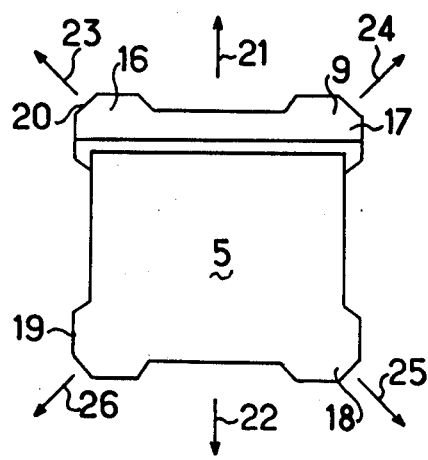
FIG. 3 is a diagrammatic view showing the direction of the forces exerted by a plate.

Action on the screw 11 has the effect of moving the plate 9 away from the branch 5 (FIG. 3) as indicated by the arrows 21, 22. This results in pressures in the corners of the tube 1 which, due to the beveled external corners 20 are directed in the directions indicated by the arrows 23,24,25,26. These four directions of force completely lock the tube 1 with respect to the branch 5.

Figure 4:
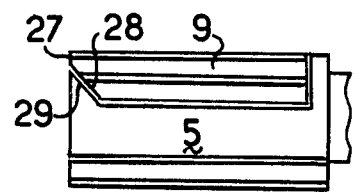
FIG. 4 is a view in elevation of a point or branch with the plate.
Figure 5:
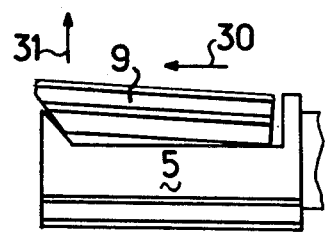
FIG. 5 is a diagrammatic view of the reaction of the forces of the plate against uncoupling.

Another feature of the floating plate 9 is that its end 27 faces the free end of the point 5 by an inclined plane 28 which cooperates with a corresponding inclined plane 29 of the point of the branch 5 (FIG. 4). The two planes 28 and 29 are inclined, as indicated in FIGS. 4 and 5, towards the inside of the point or branch 5. The role of the inclined planes 28 and 29 will now be explained and illustrated in FIG. 5.

If the corresponding screw 11 loosens slightly and the tube 1 surrounding the branch 5 tries to move out in the direction indicated by the arrow 30 (FIG. 5), the interaction of the inclined planes 28 and 29 tends to raise the end of the plate 9 in the direction indicated by the arrow 31, which produces a clamping and an expansion of the plate 9 against the interior walls of the tube 1, preventing the latter from uncoupling.

I claim:

1. In a device for the uncoupling connection of a plurality of convergent tubes by means of a star-shaped central core with branches which fit into ends of the tubes, each of the branches having means for clamping by expansion in said tubes, the ends of the tubes being shaped to fit against each other in such manner as to completely cover the central core, access being however provided to act on the clamping means of each branch, the improvement comprising in combination two means for locking said tubes around all possible axes of oscillation, whatever the intensity of the clamping, comprising said means for clamping by expansion comprising two parts comprising a first part constituting said branches being and integral one-piece part of the central core and the other part being a separate movable part for each branch juxtaposed with said first part, and screw clamping means for moving said two parts apart from each other, each of said two parts having two exterior lateral oblique bearing surfaces together forming four cornermost regions thereof, said ends of the tubes having four interior lateral oblique bearing surfaces forming four interior cornermost regions thereof complementary to and together forming inclined corners cooperating with said oblique bearing surfaces of said two parts with lateral pressure in four different directions substantially perpendicular to the oblique bearing surfaces and diagonally to the cross-section of the tubes when said screw clamping means is actuated to move said two parts apart, and said two parts having aligned free ends formed with cooperating corresponding inclined planes constituting means for moving said two parts away from each other if said movable part begins to displace longitudinally in a direction of removal of the tubes during commencement of uncoupling, said inclined planes are inclined in a direction toward said first part.

2. The device for the uncoupling connection as set forth in claim 1, wherein said branches constituting said first part and said tubes are orthogonal and said tubes form square cross-sections, said central core with said branches and said moveable part for each branch have square general cross-sections and form edges each of which has an enlargement with an external corner beveled at 45° constituting said exterior lateral oblique bearing surfaces corresponding to that of said interior lateral oblique bearing surfaces of said tubes in each corner thereof, said screw clamping means for adjusting the distance of said moveable part from said first part comprising a screw said moveable part comprises a plate formed with an opening therethrough and a non-round recess communicating with said opening and adjacent said first part, an immoveable nut positioned in said recess in said plate, and said screw extends through said opening and is threadably connected with said nut and extends therethrough pressing on said first part, said tube is formed with a hole (on a reentrant corner constituting a least exposed and least visible side) aligned with said opening such that said screw is accessible in order to be actuated from the outside on the least exposed and least visible side, said inclined plane of said first part extends upwardly facing in a general direction a central portion of the central core.

3. The device for the uncoupling connection as set forth in claim 1 or 2, wherein
said moveable part for each branch is located on a reentrant corner side of said branches of the central core.

4. The device as set forth in claim 2, wherein
said screw has an hexagonal headless socket disposed in said hole in the tubes and adapted to be turned by a wrench inserted therein.

5. The device for the uncoupling connection as set forth in claim 2, wherein
the end of said tubes is L-shaped having one side extending longer than other sides thereof, said one sides of four of said tubes completely cover a central portion of said central core.

6. The device for the uncoupling connection as set forth in claim 2, wherein
said tubes are formed with longitudinal notchings complementary to said enlargements of said two parts.

* * * * *